(12) United States Patent
Kubina et al.

(10) Patent No.: US 12,111,403 B2
(45) Date of Patent: Oct. 8, 2024

(54) ERROR AND INTEGRITY EVALUATION VIA MOTION PREDICTION

(71) Applicant: Continental Teves AG & Co. OHG, Frankfurt am Main (DE)

(72) Inventors: Bernd Kubina, Eschborn (DE); Roland Burghardt, Frankfurt am Main (DE); Robert Bodenheimer, Idstein (DE)

(73) Assignee: Continental Automotive Technologies GmbH, Hannover (DE)

( * ) Notice: Subject to any disclaimer, the term of this patent is extended or adjusted under 35 U.S.C. 154(b) by 293 days.

(21) Appl. No.: 17/620,543

(22) PCT Filed: Jun. 17, 2020

(86) PCT No.: PCT/DE2020/200048
§ 371 (c)(1),
(2) Date: Dec. 17, 2021

(87) PCT Pub. No.: WO2020/253922
PCT Pub. Date: Dec. 24, 2020

(65) Prior Publication Data
US 2022/0244399 A1  Aug. 4, 2022

(30) Foreign Application Priority Data
Jun. 18, 2019  (DE) ............. 10 2019 208 874.0

(51) Int. Cl.
G01S 19/20  (2010.01)
G01S 19/45  (2010.01)
(Continued)

(52) U.S. Cl.
CPC ............. *G01S 19/20* (2013.01); *G01S 19/45* (2013.01); *G01S 19/47* (2013.01); *G01S 19/40* (2013.01); *G01S 19/48* (2013.01); *G01S 19/485* (2020.05)

(58) Field of Classification Search
CPC .......... G01S 19/20; G01S 19/45; G01S 19/48; G01S 19/485; G01S 19/47; G01S 19/40
(Continued)

(56) References Cited

U.S. PATENT DOCUMENTS 5,714,948 A  2/1998 Farmakis et al.
6,516,021 B1  2/2003 Abbott et al.
(Continued)

FOREIGN PATENT DOCUMENTS

CN  108919312 A  11/2018
DE  102013016243 A1  7/2014
(Continued)

OTHER PUBLICATIONS

Search Report dated Jul. 1, 2022 from corresponding Russian patent application No. 2022100835.
(Continued)

*Primary Examiner* — Chuong P Nguyen

(57) ABSTRACT

Error and integrity evaluation during a position determination, includes: recording position values ($P_{-N}$, $P_{-2}$, $P_{-1}$) and calculating clock errors of a receiver via time-discrete runtime measurements by a satellite navigation system; recording a first pseudo-distance at a later time via time-discrete runtime measurement by the satellite navigation system; extrapolating a position value ($P'_0$) of the receiver at the later time and extrapolating a clock error of the receiver at the later time; establishing a distance ($r'_0$) between the extrapolated position value ($P'_0$) of the receiver and the position of a satellite ($S_0$) of the satellite navigation system at the later time, wherein a quality measure for the usability of the position determination with the satellite is obtained by forming a second pseudo-distance based on the sum of the established distance ($r'_0$) and the extrapolated clock error at
(Continued)

the later time and comparing the second pseudo-distance with the first pseudo-distance.

18 Claims, 2 Drawing Sheets

(51) Int. Cl.
*G01S 19/47* (2010.01)
*G01S 19/40* (2010.01)
*G01S 19/48* (2010.01)

(58) Field of Classification Search
USPC .............. 342/357.28, 357.31, 357.3, 357.58, 342/357.23
See application file for complete search history.

(56) References Cited

U.S. PATENT DOCUMENTS

| | | | | |
|---|---|---|---|---|
| 7,439,907 | B2* | 10/2008 | Wang | G01S 19/40 342/357.23 |
| 7,994,974 | B2* | 8/2011 | Levy | G01S 19/08 342/357.58 |
| 8,421,670 | B2* | 4/2013 | Kojima | G01S 19/426 342/357.78 |
| 8,525,727 | B2* | 9/2013 | Roh | G01S 19/22 342/357.77 |
| 11,353,596 | B2* | 6/2022 | Robinson | G01S 19/42 |
| 11,740,363 | B2* | 8/2023 | Kubina | G01S 5/0257 342/357.62 |
| 2006/0229805 | A1* | 10/2006 | Diggelen | G01S 5/0036 701/469 |
| 2007/0109185 | A1* | 5/2007 | Kracke | G01S 19/49 342/357.29 |
| 2008/0117100 | A1 | 5/2008 | Wang et al. | |
| 2011/0018763 | A1* | 1/2011 | Watanabe | G01S 19/396 342/357.62 |
| 2011/0025558 | A1 | 2/2011 | Levy | |
| 2011/0235686 | A1 | 9/2011 | Kojima et al. | |
| 2019/0271783 | A1* | 9/2019 | Robinson | G01S 19/215 |
| 2023/0077069 | A1* | 3/2023 | Zalcberg | G01S 19/071 |

FOREIGN PATENT DOCUMENTS

| | | | |
|---|---|---|---|
| EP | 1729145 A1 | 12/2006 | |
| JP | 2011209268 A | 10/2011 | |
| JP | 5989813 B2 | 9/2016 | |
| RU | 2501039 C2 | 12/2013 | |
| WO | WO-2017154779 A1 * | 9/2017 | ............ G01S 19/07 |

OTHER PUBLICATIONS

Notice of Reasons for Refusal dated May 18, 2023 from corresponding Japanese patent application No. 2021-569949.
Examination Report dated Sep. 27, 2023 from corresponding European patent application No. 20735475.4.
Search Report dated Feb. 5, 2020 from corresponding German patent application No. DE 10 2019 208 874.0.
V. Dorot et al. "Explanatory Dictionary of Modern computer vocabulary (3rd edition)", ISBN 5-94157-491-6 BHV Petersburg, St. Petersburg, 2004,—D3), 2004 and translation of same.

* cited by examiner

ERROR AND INTEGRITY EVALUATION VIA MOTION PREDICTION

BACKGROUND

The invention relates to a method for error and integrity evaluation during a position determination as well as a control device and a computer program product for performing the method.

Nowadays, the absolute geoposition of a vehicle can be determined with the aid of receivers for global satellite navigation systems (GNSS), hereinafter also referred to as GNSS measurement. In addition, the relative motion of a vehicle can be determined, for example with the aid of inertial (IMU) and odometry (ODO) sensor technology installed in the vehicle.

Firstly, the GNSS system makes it possible to measure the receiver position via runtime measurements, also known as code ranging. Secondly, it makes it possible to measure the receiver speed via Doppler shifts.

Within the framework of sensor fusion, GNSS, IMU and ODO measurements can be fused in order to obtain more precise and more readily available position determinations. The sensor fusion is usually realized with Kalman or particle filters.

The known methods for detecting errors in GNSS measurements include receiver autonomous integrity monitoring (RAIM) and fault detection and exclusion (FDE). These utilize the fact that, as a general rule, more than the necessary four satellite signals are available during a GNSS measurement. At least six satellites must be available during fault detection and exclusion. Furthermore, the code-minus-carrier and double-delta correlator methods exist to detect GNSS multipath propagation.

Basically, sporadic errors which are not recognized with the current prior art occur during GNSS measurements in the vehicle. This limits the level of reliability and, therefore, the integrity of the positioning established by means of GNSS.

During the position determination, which is to be understood below both in the sense of localization and in the sense of speed or acceleration determination, slowly and rapidly changing errors are found. The causes of rapidly changing measurement errors most notably include so-called non-line-of-sight (NLOS) propagation paths of the radio signal, in particular in the case of moving receivers, but furthermore also errors in the GNSS satellite such as random hardware and software errors, for example exceptionally rapid clock drifts.

The NLOS signals indicated are created by reflection and scattering of the radio signal in the immediate vicinity of the receiver such as, for example, buildings. A distinction can be made here between various possibilities of superimposing undesired NLOS and the desired direct line-of-sight (LOS) signal. A large part of these superimposition possibilities is described by the term multipath propagation.

In the case of fused filter methods, errors in the sensors involved in each case can lead to incorrect position determination. Here, in addition to the NLOS signals of the GNSS, drift and offset in the inertial sensor technology, and offsets in the odometry, are to be indicated as possible causes of errors. In particular, Kalman filter solutions show the undesired temporal error propagation.

The GNSS error detectors RAIM and FDE indicated above are basically limited to an isolated consideration of the GNSS signals, which limits the detection of similar errors (common mode failure). Furthermore, RAIM and FDE show detection weaknesses if multiple satellites are disturbed at the same time.

The object which therefore forms the basis of the invention is to achieve an improved error and integrity evaluation during a position determination. It should preferably also be achieved that rapidly changing errors in the GNSS measurement, in particular caused by multipath propagation, and/or by errors in measurements of the inertial sensor technology or the odometry, are detected and the integrity of the established vehicle position is therefore increased.

BRIEF SUMMARY

The object is achieved by the features of the independent claims. Preferred further developments are the subject-matter of the dependent claims. By express reference, the claims are made part of the description at this point.

According to an aspect of the invention, a method for error and integrity evaluation during a position determination comprises recording position values and calculating clock errors of a receiver via time-discrete runtime measurements by means of a satellite navigation system. The position values preferably comprise a position indication in a three-dimensional coordinate system for each of the individual measurements, which is established by measuring the runtime of the GNSS signal and multiplying by the speed of light. The history of the position values is preferably stored so that it is available for later method steps.

A runtime measurement, often also referred to as code ranging or pseudorange, is preferably understood to mean that the time difference which passes between the outputting of a GNSS signal from the phase center of the satellite antenna up to reception of the signal in the phase center of the receiver antenna is measured. Multiplying this by the speed of light produces the spacing between the two, which is, admittedly, very inaccurate due to the lack of synchronization of the clocks of the satellite and receiver. In addition to the carrier signal and the ephemeris data of the satellite, the GNSS signal comprises a code which is also contained in the receiver and which the receiver shifts, so to speak, so far that it is synchronized with the code received from the satellite. This shift corresponds to the measured runtime.

A pseudo-distance generally refers to the distance resulting from a measurement between a satellite and a receiver, if key inaccuracy factors are also included. Due to the large value of the speed of light, even small clock errors lead to large deviations during a runtime measurement, which also applies to the position values recorded via time-discrete runtime measurements. Mathematically, a pseudo-distance $PR$ can be described for a time $i$ by $PR\_i = r\_i + e\_RecClock\_i + e\_other\_i + e\_MP\_i$, wherein $r\_i$ describes the actual distance between the satellite and receiver, $e\_RecClock\_i$ describes the receiver clock error, $e\_other\_i$ describes further errors such as ionospheric, noise and satellite clock errors and $e\_MP\_i$ describes rapidly changing errors such as multipath or NLOS errors, in each case at time $i$. The error $e\_RecClock$ is mathematically calculated or estimated in the receiver after each pseudorange measurement. The error terms can assume both positive and negative values.

A further step of the method according to the invention includes recording a first pseudo-distance at a later, preferably the current, time via time-discrete runtime measurement by means of the satellite navigation system. The clock error can be established, for example, in a known manner, provided that four GNSS satellites are available. Clock errors are preferably converted into a distance which results from multiplying the time difference corresponding to the clock error by the speed of light. A comparison value obtained by measurement is available with the first pseudo-distance.

In order to make possible a comparison, a predicted variable, the second pseudo-distance, is provided. To this end, a position value of the receiver, which is assigned to the later time, is extrapolated based on a trajectory, that is to say the trajectory is logically continued for a time step. The trajectory reflects the preceding motion path of the receiver continuously or for discrete times. In addition, the clock error for the later time is also extrapolated using the previous course of the clock errors. This is effected based on a number of the clock errors calculated before the later time, wherein the number can have been specified variably or once.

Furthermore, the method includes establishing a distance between the extrapolated position value of the receiver and the position of a satellite of the satellite navigation system at the later time. As explained above, the basis for the extrapolated position value is formed by the position values recorded via time-discrete runtime measurements. The extrapolated position value, that is to say the estimated position value assigned to the later time, consequently forms the one end of an actual distance, the other end of which is formed by the satellite, the position of which is known, for example, from the transferred ephemeris data. The satellite is preferably any selected satellite from the satellites available within the meaning of a direct signal transmission.

In order to obtain a comparison value for the first pseudo-distance from the distance between the extrapolated position value of the receiver and the position of the satellite, the extrapolated clock error, that is to say the estimated clock error assigned to the later time, is added to the established distance. As explained above, the extrapolated clock error is meaningfully expressed as a distance. The second pseudo-distance thus obtained is then compared with the first pseudo-distance.

In other words, in the case of the method according to the invention, an estimated value or a prediction of the receiver position and of the clock error of the receiver is thus formed and the associated pseudo-distance is calculated. This predicted pseudo-distance is compared with the measured pseudo-distance in order to obtain a better quality measure for the errors and integrity of the runtime measurement of the specific satellite in a simple, inexpensive and efficient manner and, in particular, to recognize rapidly changing errors. The method is preferably repeated for other satellites of the satellite navigation system.

Unlike the conventional FDE method, the error and integrity evaluation can be effected, in the case of the method according to the invention, prior to solving the position equation system, in which the position of the receiver is calculated with the aid of the data from multiple satellites, resulting in a lower computational expense.

In contrast to the code-minus-carrier method, the error and integrity evaluation is independent of the type of error of the NLOS propagation path, that is to say for example multipath propagation that occurs exclusively or multipath propagation that occurs in addition to a direct signal path.

The receiver is preferably a vehicle, or the receiver is arranged or permanently installed in a vehicle.

It is preferred that the trajectory is formed by a number of the position values recorded before the later time via time-discrete runtime measurements by means of a satellite navigation system and/or is extracted from data of environment capturing sensors, in particular camera, radar and/or lidar. It is possible to utilize environment capturing sensors because said environment capturing sensors, starting from a known absolute position, can update the latter by capturing the motion.

The later time preferably corresponds to the present time. By way of contrast, the recording of position values and the calculation of clock errors of the receiver are performed at earlier times, that is to say in the past before the later time. The times are preferably evenly spaced, i.e., the time-discrete runtime measurements and, preferably, the later time are each equidistant, temporally, from the previous time. That is to say, the later time is preferably the next step following a specific cycle after a series of measurement times. The cycle preferably corresponds to the scanning rate of the receiver.

According to a preferred embodiment, in order to extrapolate the position value of the receiver at the later time, a position value difference is derived from the position value differences of the previously recorded position values. That is to say, the changes from position value to position value are considered in order to estimate the position value at the later time therefrom.

In accordance with a preferred embodiment, the extrapolation of the position value of the receiver is in addition based on inertia modeling, measurements of inertial sensor technology (IMU), measurements of odometry sensor technology, and/or Doppler measurements of the satellite navigation. Inertial sensor technology normally comprises sensors which measure accelerations and rotation rates, while odometry allows the vehicle's own position to be determined by measuring data from a propulsion system such as, for example, wheel speeds and/or steering motions.

According to a preferred embodiment, the extrapolation of the clock error of the receiver is in addition based on temperature measurements, saved information regarding a clock drift and/or regarding the clock quartz so that the clock error can be determined even more precisely.

It is preferred that the extrapolation of the clock error of the receiver is effected, as already explained above, in the form of a distance value which is equivalent to the clock error.

According to a preferred embodiment of the method, when the distance $(r'_0)$ between the extrapolated position value $(P'_0)$ of the receiver and the position of the satellite $(S_0)$ is established, the position of the satellite is established from the ephemeris data of said satellite, which are transmitted with the satellite signal.

The comparison of the second pseudo-distance with the first pseudo-distance preferably comprises a difference formation. The difference can be stored or sent as a variable, or preferably utilized directly as a starting point for further measures which are used to react to the currently established erroneousness or integrity of the runtime measurement of the satellite. In the event of a large difference, it can make sense, for example, to initially exclude the satellite from the determination of the receiver position.

It is preferred that, relative to a reference value, a high quality measure is assigned to a small difference and a small quality measure is assigned to a large difference, and a corresponding quality measure is specified. Consequently, a uniform measure is provided for the quality.

According to a preferred embodiment, a check is effected for indirectly received signals which have been produced, for example, by multipath propagation, wherein a rapid change in the quality measure relative to a reference value is rated as an indication of an indirect signal reception.

According to a further aspect of the invention, a control device is configured to perform a method, as described.

The control device preferably has a memory and a processor, wherein the method is saved in the memory in the form of a computer program and the processor is configured to carry out the method when the computer program is loaded from the memory into the processor.

The computer program of the control device preferably comprises program code means in order to perform all the steps of the method when the computer program is run on a computer or one of the previously indicated devices.

According to a further aspect of the invention, a computer program product comprises a program code which is stored on a computer-readable data carrier and which, when it is run on a data processing apparatus, performs one of the indicated methods.

The properties, features and advantages of this invention, which have been described above, as well as the way in which these are achieved will become clearer and much more comprehensible in connection with the following description of an exemplary embodiment in connection with the drawing.

DETAILED DESCRIPTION

Figure 1:
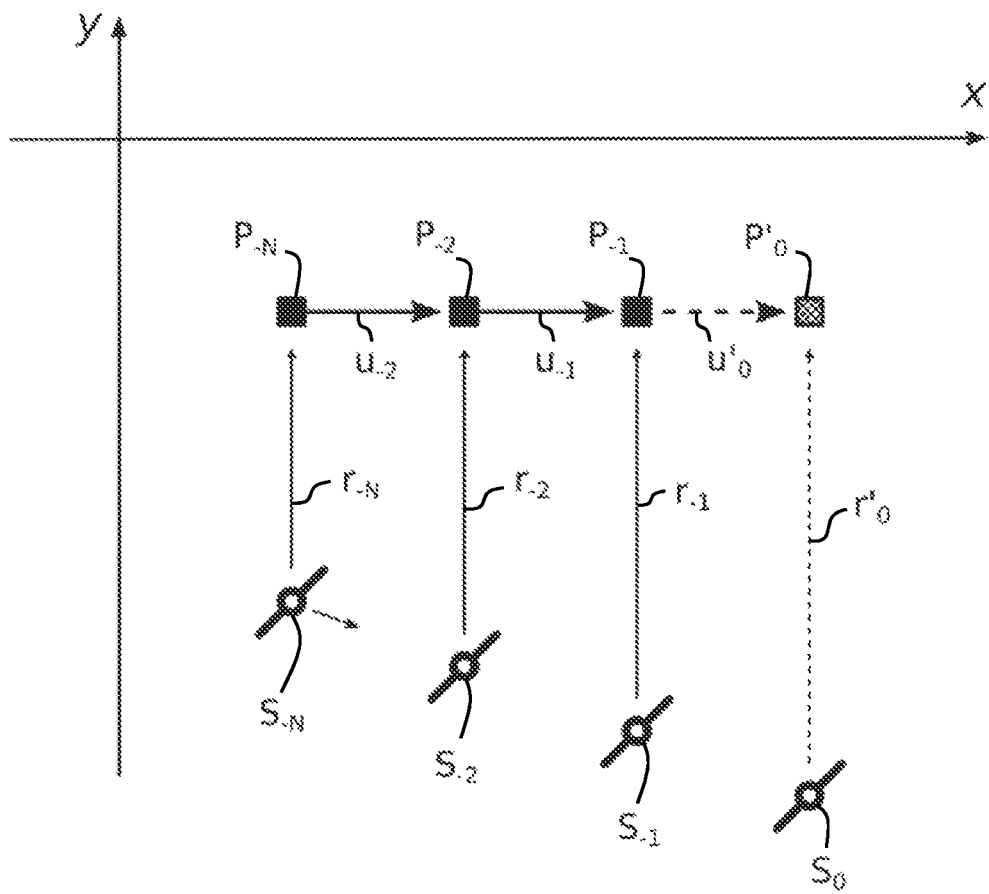
FIG. 1 shows a schematic representation of a two-dimensional, exemplary representation of the motion of a receiver and a satellite.

FIG. 1 shows a schematic representation of a two-dimensional, exemplary representation of the motion of a receiver and a satellite, stretched along the spatial axes X, Y, as well as their spacings at determined times, wherein the receiver is contained in a vehicle, the motion of which is equated with that of the receiver. The reference numerals each contain a time index i, wherein the scanning time is denoted by i. $-N$, $-2$ and $-1$ accordingly denote times in the past, at which measurements were performed. By way of contrast, a later time corresponds to the present and is denoted by $i=0$. The satellite shown is representative of any satellite and takes up the positions $S_{-N}$, $S_{-2}$, $S_{-1}$, $S_0$ at the various times i.

The position values correspond to the receiver position, wherein P is described by $P_{-N}$, $P_{-2}$, $P_{-1}$. They are obtained via time-discrete runtime measurements by means of a satellite navigation system, for example NAVSTAR GPS, Galileo, GLONASS or Beidou. The vectors $u_{-1}$, $u_{-2}$, accordingly up to $u_{-(N-1)}$, describe the changes of position which each represent the difference between two position values. From change of position to change of position, the distances $r_{-N}$, $r_{-2}$, $r_{-i}$ between the receiver and satellite also alter in the exemplary embodiment. The position value $P_0$ and the distance $r_0$ from the satellite is also determined for the later time, $i=0$, from which a first pseudo-distance is established as the measured distance by adding the currently measured clock error $\Delta t_0$.

Using the previous changes of position, an estimated value $u'_0$ for the change of position of the following, that is to say current or present, scanning time is estimated by logical continuation. Consequently, an estimation, here generally characterized by an apostrophe, of the current position value $P'_0$ of the receiver is obtained with the aid of the motion history. Inertia modeling of the vehicle, measurements of inertial sensor technology, measurements of odometry sensor technology, and Doppler measurements of the satellite navigation have been used as additional information.

An estimation is also performed for the clock error of the receiver, in other words the time difference by which the clock thereof deviates from the satellite clock. To this end, the history of the last measured clock errors is enlisted in order to extrapolate the corresponding time difference $\Delta t'_0$, which is, however, expressed as a distance equivalent for easier further calculation. In addition, saved information regarding the clock drift or regarding the clock quartz as well as temperature measurements are included in the extrapolation.

Furthermore, the actual distance $r'_0$ between the satellite and the receiver is calculated from this estimated information, wherein the term actual distance is to be understood such that this distance does not contain any clock, ionospheric or other errors which are usual during satellite measurement, which is because this distance is calculated as the distance between two points. A second pseudo-distance is provided by adding the clock error $\Delta t'_0$ which is likewise estimated. In addition to the clock error $\Delta t'_0$, further error variables can be added to form the estimated, that is to say, the second, pseudo-distance in order to be in line with the first pseudo-distance which may possibly also contain further error variables such as, for example, ionospheric errors. The difference between the first and second pseudo-distance, provided that only the clock error $\Delta t'_0$ is added, that is to say $|(r'_0+\Delta t'_0)-(r_0+\Delta t_0)|$, includes information regarding rapidly changing errors that may possibly be present, for example caused by multipath propagation of the satellite signal, since the measured distance deviates, as a result, erratically from the distance obtained by extrapolation or estimation. Generally, the amount of the difference, conversely, reflects the integrity of the measurement, wherein this works all the better over a larger number of time steps.

Consequently, the size of the difference is a quality measure for the errors and integrity of the runtime measurement of the specific satellite. Greater meaningfulness can be achieved when the method is repeated multiple times or by a higher number of utilized time steps or measurements for the estimation, however it basically makes sense to seek a compromise regarding the necessary computational power.

The method or a corresponding control device can be deployed in any systems, for example in motor vehicles, drones, airplanes or ships.

Figure 2:
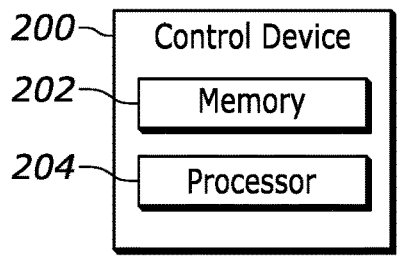
FIG. 2 depicts a control device in accordance with embodiments of the invention.

A control device 200, in accordance with embodiments of the invention, is depicted in FIG. 2. As shown, the control device has a memory 202 and a processor 204, wherein the method is saved in the memory in the form of a computer program, and the processor is configured to carry out the method when the computer program is loaded from the memory into the processor.

Figure 3:
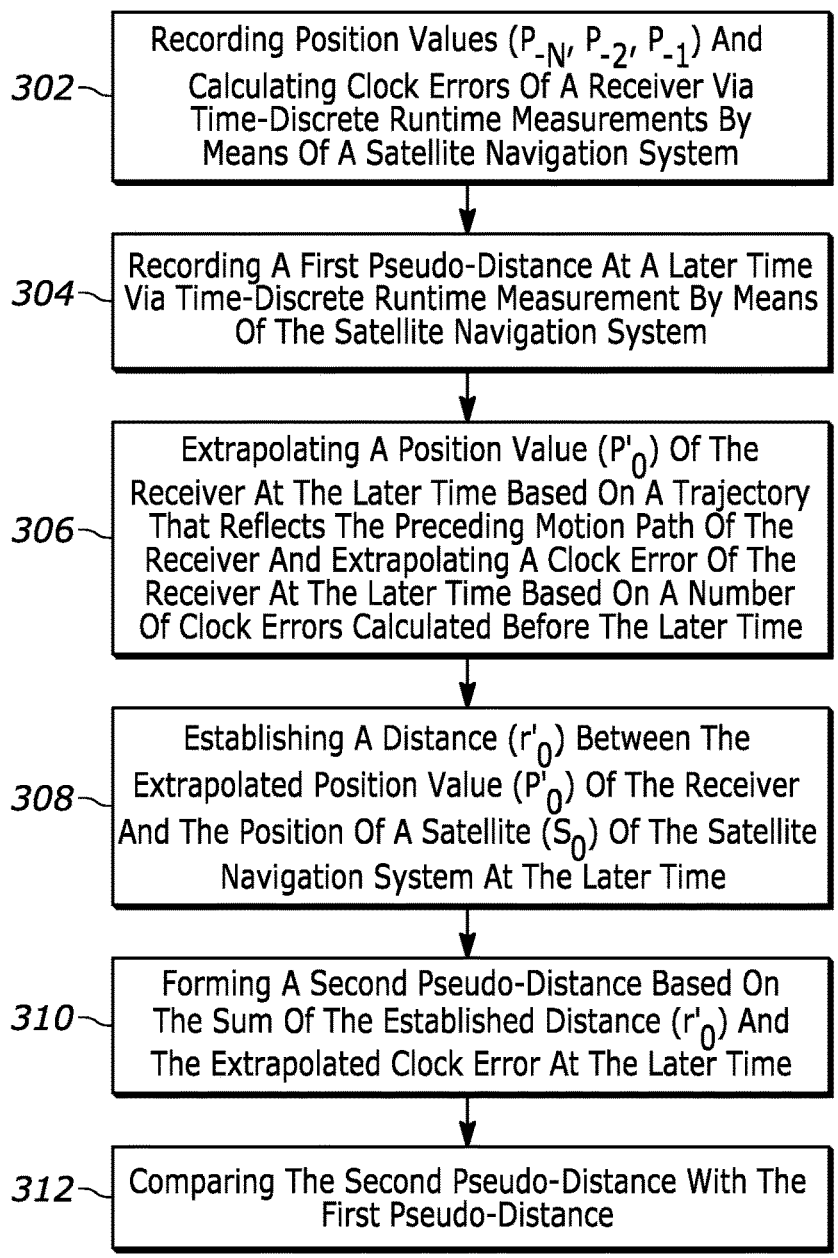
FIG. 3 is a flow chart depicting a method for error and integrity evaluation during a position determination, in accordance with embodiments of the invention.

FIG. 3 is a flow chart depicting a method for error and integrity evaluation during a position determination, in accordance with embodiments of the invention. The method begins with recording position values ($P_{-N}$, $P_{-2}$, $P_{-1}$) and calculating clock errors of a receiver via time-discrete runtime measurements by means of a satellite navigation system, as shown at 302. Then, recording a first pseudo-distance at a later time via time-discrete runtime measurement by means of the satellite navigation system is performed, as shown at 304. Then, extrapolating a position value ($P'_0$) of the receiver at the later time based on a trajectory that reflects the preceding motion path of the receiver and extrapolating a clock error of the receiver at the later time based on a number of clock errors calculated before the later time is performed, as shown at 306. Then, establishing a distance ($r'_0$) between the extrapolated position value (P'0) of the receiver and the position of a satellite ($S_0$) of the satellite navigation system at the later time, is performed, as shown at 308.

A quality measure for the usability of the position determination with the satellite is obtained by: forming a second pseudo-distance based on the sum of the established distance ($r'_0$) and the extrapolated clock error at the later time, as shown at 310, and comparing the second pseudo-distance with the first pseudo-distance, as shown at 312.

The invention claimed is:

1. A method for error and integrity evaluation during a position determination, comprising:
   recording position values ($P_{-N}$, $P_{-2}$, $P_{-1}$) and calculating clock errors of a receiver via time-discrete runtime measurements by means of a satellite navigation system;
   recording a first pseudo-distance at a later time via time-discrete runtime measurement by means of the satellite navigation system;
   extrapolating a position value ($P'_0$) of the receiver at the later time based on a trajectory that reflects the preceding motion path of the receiver and extrapolating a clock error of the receiver at the later time based on a number of clock errors calculated before the later time;
   establishing a distance ($r'_0$) between the extrapolated position value (P'0) of the receiver and the position of a satellite ($S_0$) of the satellite navigation system at the later time;
   wherein a quality measure for the usability of the position determination with the satellite is obtained by
   forming a second pseudo-distance based on the sum of the established distance ($r'_0$) and the extrapolated clock error at the later time, and
   comparing the second pseudo-distance with the first pseudo-distance.

2. The method according to claim 1, characterized in that the trajectory is formed by a number of the position values ($P_{-N}$, $P_{-2}$, $P_{-1}$) recorded before the later time and/or is extracted from data of environment capturing sensors, in particular camera, radar and/or lidar.

3. The method according to claim 1, characterized in that the later time corresponds to a present time and the recording of position values ($P_{-N}$, $P_{-2}$, $P_{-1}$) and the calculation of clock errors of the receiver were performed, by way of contrast, at past, in particular evenly spaced, times.

4. The method according to claim 1, characterized in that in order to extrapolate the position value ($P'_0$) of the receiver at the later time, a position value difference ($u'_0$) is derived from the position value differences ($u_{-1}$, $u_{-2}$) of the previously recorded position values ($P_{-N}$, $P_{-2}$, $P_{-1}$).

5. The method according to claim 1, characterized in that the extrapolation of the position value ($P'_0$) of the receiver is in addition based on inertia modeling, measurements of inertial sensor technology, measurements of odometry sensor technology, and/or Doppler measurements of the satellite navigation.

6. The method according to claim 1, characterized in that the extrapolation of the clock error of the receiver is effected in the form of a distance value which is equivalent to the clock error.

7. The method according to claim 1, characterized in that when the distance ($r'_0$) between the extrapolated position value (P'0) of the receiver and the position of the satellite ($S_0$) is established, the position ($S_0$) of the satellite is established from the ephemeris data thereof, which are transmitted with the satellite signal.

8. The method according to claim 1, characterized in that the comparison of the second pseudo-distance with the first pseudo-distance comprises a difference formation.

9. The method of claim 8,
   wherein a quality measure is inversely related to the difference formation.

10. The method according to claim 8, characterized in that a check is effected for indirectly received signals, wherein a rapid change in the quality measure relative to a reference value is assessed as an indication of an indirect signal reception.

11. A control device configured for error and integrity evaluation during a position determination by performing operations comprising:
    recording position values ($P_{-N}$, $P_{-2}$, $P_{-1}$) and calculating clock errors of a receiver via time-discrete runtime measurements by means of a satellite navigation system;
    recording a first pseudo-distance at a later time via time-discrete runtime measurement by means of the satellite navigation system;
    extrapolating a position value ($P'_0$) of the receiver at the later time based on a trajectory that reflects the preceding motion path of the receiver and extrapolating a clock error of the receiver at the later time based on a number of clock errors calculated before the later time;
    establishing a distance ($r'_0$) between the extrapolated position value (P'0) of the receiver and the position of a satellite ($S_0$) of the satellite navigation system at the later time;
    wherein a quality measure for the usability of the position determination with the satellite is obtained by
    forming a second pseudo-distance based on the sum of the established distance ($r'_0$) and the extrapolated clock error at the later time, and
    comparing the second pseudo-distance with the first pseudo-distance.

12. The control device according to claim 11, having a computer-readable non-transitory memory and a processor, wherein computer-executable instructions are saved in the memory in the form of a computer program, and the processor is configured to execute the instructions when the computer program is loaded from the memory into the processor.

13. The control device according to claim 12, characterized in that the trajectory is formed by a number of the position values ($P_{-N}$, $P_{-2}$, $P_{-1}$) recorded before the later time and/or is extracted from data of environment capturing sensors, in particular camera, radar and/or lidar.

14. The control device according to claim 12, characterized in that the later time corresponds to a present time and the recording of position values ($P_{-N}$, $P_{-2}$, $P_{-1}$) and the calculation of clock errors of the receiver were performed, by way of contrast, at past, in particular evenly spaced, times.

15. The control device according to claim 12, characterized in that in order to extrapolate the position value ($P'_0$) of the receiver at the later time, a position value difference ($u'_0$) is derived from the position value differences ($u_{-1}$, $u_{-2}$) of the previously recorded position values ($P_{-N}$, $P_{-2}$, $P_{-1}$).

16. The control device according to claim 12, characterized in that the extrapolation of the position value ($P'_0$) of the receiver is in addition based on inertia modeling, measurements of inertial sensor technology, measurements of odometry sensor technology, and/or Doppler measurements of the satellite navigation.

17. The control device according to claim 11, characterized in that the extrapolation of the clock error of the receiver is effected in the form of a distance value which is equivalent to the clock error.

18. The control device according to claim 11, characterized in that when the distance ($r'_0$) between the extrapolated position value ($P'_0$) of the receiver and the position of the satellite ($S_0$) is established, the position ($S_0$) of the satellite is established from the ephemeris data thereof, which are transmitted with the satellite signal.

\* \* \* \* \*